United States Patent
Kong et al.

(10) Patent No.: US 12,147,774 B2
(45) Date of Patent: Nov. 19, 2024

(54) INTELLIGENT LEADING MULTI-ROUND INTERACTIVE AUTOMATED INFORMATION SYSTEM

(71) Applicant: INTERNATIONAL BUSINESS MACHINES CORPORATION, Armonk, NY (US)

(72) Inventors: De Shuo Kong, Beijing (CN); Zheng Jie, Beijing (CN); Hai Bo Zou, Beijing (CN); Yao Chen, Beijing (CN); Hai Ji, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 560 days.

(21) Appl. No.: 16/894,091

(22) Filed: Jun. 5, 2020

(65) Prior Publication Data
US 2021/0383075 A1 Dec. 9, 2021

(51) Int. Cl.
*G06F 17/00* (2019.01)
*G06F 40/40* (2020.01)
(Continued)

(52) U.S. Cl.
CPC ............... *G06F 40/40* (2020.01); *G06N 5/01* (2023.01); *G06N 5/04* (2013.01); *G06N 20/20* (2019.01)

(58) Field of Classification Search
CPC .......... G06F 40/40; G06N 20/20; G06N 5/01; G06N 5/04
(Continued)

(56) References Cited

U.S. PATENT DOCUMENTS 7,957,970 B1 6/2011 Gorin et al.
9,116,986 B1 * 8/2015 Jackson ............. G06Q 10/1095
(Continued)

FOREIGN PATENT DOCUMENTS

CN 107798140 A 3/2018

OTHER PUBLICATIONS

Gandhe et al., "Improving Question-Answering With Linking Dialogues", https://www.researchgate.net/publication/221608034_Improving_question_answering_with_linking_dialogues, Proceedings of the 2006 International Conference on Intelligent User Interfaces, Sydney, Australia, ResearchGate, Feb. 1, 2006, 4 pages.
(Continued)

*Primary Examiner* — Paul C McCord
(74) *Attorney, Agent, or Firm* — Gavin Giraud; Andrew D. Wright; Calderon Safran & Wright P.C.

(57) ABSTRACT

A method includes: receiving, by a computer device, a user question; extracting, by the computer device and from a knowledge base, multiple answers to the user question; detecting, by the computer device, a first relationship entity that exists in a subset of the multiple answers to the user question; determining, by the computer device, that the first relationship entity is a condition, the condition being a relationship entity that has different values in the subset of the multiple answers; generating, by the computer device, a first follow-up question that solicits a value of the condition; receiving, by the computer device, an answer to the first follow-up question; and determining, by the computer device, a number of the subset of the multiple answers that have a value of the condition that matches the answer to the first follow-up question.

20 Claims, 7 Drawing Sheets

(51) Int. Cl.
*G06N 5/01* (2023.01)
*G06N 5/04* (2023.01)
*G06N 20/20* (2019.01)

(58) Field of Classification Search
USPC .............................................................. 704/9
See application file for complete search history.

(56) References Cited

U.S. PATENT DOCUMENTS

| | | | |
|---|---|---|---|
| 9,529,845 | B2 | 12/2016 | Chu-Carroll et al. |
| 9,740,677 | B2 | 8/2017 | Kim et al. |
| 10,896,295 | B1* | 1/2021 | Shenoy ................ G10L 15/187 |
| 2007/0124188 | A1* | 5/2007 | Herman ................ G06Q 90/00 705/7.12 |
| 2011/0282888 | A1* | 11/2011 | Koperski .............. G06F 16/951 707/E17.061 |
| 2013/0337781 | A1* | 12/2013 | Lau ....................... H04M 1/725 455/414.1 |
| 2014/0047385 | A1* | 2/2014 | Ruble ................. G06F 16/4393 715/810 |
| 2014/0072948 | A1* | 3/2014 | Boguraev ................ G09B 7/00 434/362 |
| 2014/0081953 | A1* | 3/2014 | Ingram ................ G06F 16/248 707/722 |
| 2015/0161242 | A1* | 6/2015 | Visotski ............... G06F 16/338 707/730 |
| 2015/0172837 | A1* | 6/2015 | Martinez Azkorra . H04R 25/70 381/314 |
| 2016/0217784 | A1 | 7/2016 | Gelfenbeyn et al. |
| 2016/0358240 | A1* | 12/2016 | Redfern .............. G06Q 30/0619 |
| 2017/0097940 | A1* | 4/2017 | Panuganty ........ G06F 16/90324 |
| 2017/0116982 | A1 | 4/2017 | Gelfenbeyn et al. |
| 2018/0293221 | A1* | 10/2018 | Finkelstein ............ G06N 20/00 |
| 2018/0308473 | A1 | 10/2018 | Scholar |
| 2019/0147098 | A1* | 5/2019 | Beller ................ G06F 16/3334 704/9 |
| 2019/0260694 | A1 | 8/2019 | Londhe et al. |
| 2020/0034722 | A1* | 1/2020 | Oh .......................... G06N 5/04 |
| 2020/0097547 | A1* | 3/2020 | Williams ................ G06F 40/30 |
| 2021/0279599 | A1* | 9/2021 | Carbune ................ G06N 5/022 |
| 2023/0072511 | A1* | 3/2023 | Wu ....................... G06F 16/285 |

OTHER PUBLICATIONS

Saha et al., "Complex Sequential Question Answering: Towards Learning to Converse Over Linked Question Answer Pairs with a Knowledge Graph", https://www.researchgate.net/publication/322851742_Complex_Sequential_Question_Answering_Towards_Learning_to_Converse_Over_Linked_Question Answer_Pairs_with_a_Knowledge_Graph, Proceedings of the Thirty-Second AAAI Conference on Artificial Intelligence, (AAAI-18), ResearchGate, Feb. 7, 2018, 10 pages.

Mell et al., "The NIST Definition of Cloud Computing", NIST, Special Publication 800-145, Sep. 2011, 7 pages.

* cited by examiner

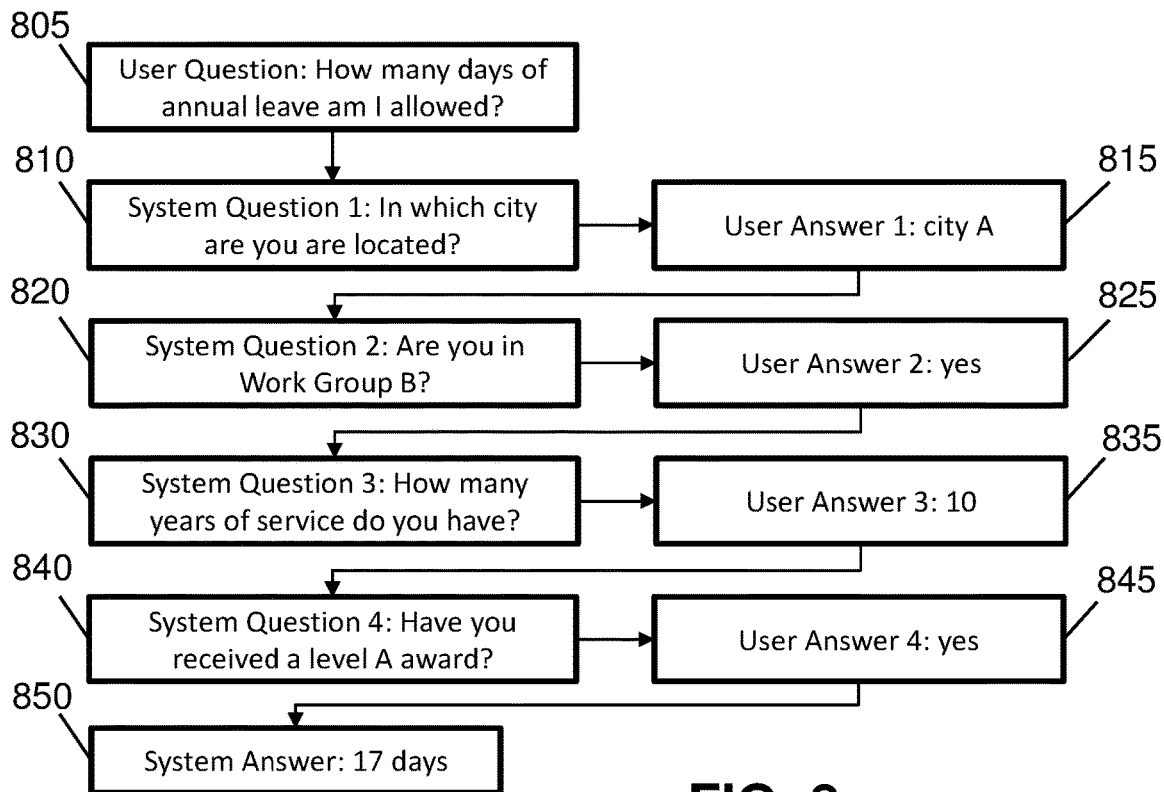

INTELLIGENT LEADING MULTI-ROUND INTERACTIVE AUTOMATED INFORMATION SYSTEM

BACKGROUND

Aspects of the present invention relate generally to automated information systems and, more particularly, to an automated intelligent interactive information system that presents questions to a user based on previous input from the user and conditions that exist in a knowledge base of the system.

Some companies or other entities use automated telephone answering systems to provide an answer to a user question. Some of these systems access databases for an answer that most nearly corresponds to the user question.

SUMMARY

In a first aspect of the invention, there is a computer-implemented method including: receiving, by a computer device, a user question; extracting, by the computer device and from a knowledge base, multiple answers to the user question; detecting, by the computer device, a first relationship entity that exists in a subset of the multiple answers to the user question; determining, by the computer device, that the first relationship entity is a condition, the condition being a relationship entity that has different values in the subset of the multiple answers; generating, by the computer device, a first follow-up question that solicits a value of the condition; receiving, by the computer device, an answer to the first follow-up question; and determining, by the computer device, a number of the subset of the multiple answers that have a value of the condition that matches the answer to the first follow-up question.

In another aspect of the invention, there is a computer program product including one or more computer readable storage media having program instructions collectively stored on the one or more computer readable storage media. The program instructions are executable to: receive a user question from a user; extract from a knowledge base multiple answers to the user question; detect a first relationship entity that exists in a subset of the multiple answers to the user question; determine that the first relationship entity is a condition, the condition being a relationship entity that has different values in the subset of the multiple answers; generate a first follow-up question that solicits from the user a value of the condition; receive from the user an answer to the first follow-up question; determine a number of the subset of the multiple answers that have a value of the condition that matches the answer to the first follow-up question; and in response to the number being other than 1, detect a second relationship entity that exists in a subset of the subset.

In another aspect of the invention, there is system including a processor, a computer readable memory, one or more computer readable storage media, and program instructions collectively stored on the one or more computer readable storage media. The program instructions are executable to: receive a user question from a user; extract from a knowledge base multiple answers to the user question; detect a first relationship entity that exists in a subset of the multiple answers to the user question; determine that the first relationship entity is a condition, the condition being a relationship entity that has different values in the subset of the multiple answers; generate a first follow-up question that solicits from the user a value of the condition; receive from the user an answer to the first follow-up question; determine a number of the subset of the multiple answers that have a value of the condition that matches the answer to the first follow-up question; present, in response to the number being 1, the one of the multiple answers that has the value of the condition that matches the answer to the first follow-up question as a final answer to the user question; and store in a knowledge corpus, for future use, the condition and the multiple answers that include the condition.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 6 shows a table in support of FIG. 8.

FIG. 7 shows a chart in support of FIG. 8.

FIG. 8 shows a flowchart of an exemplary method in accordance with aspects of the invention.

DETAILED DESCRIPTION

Figure 1:
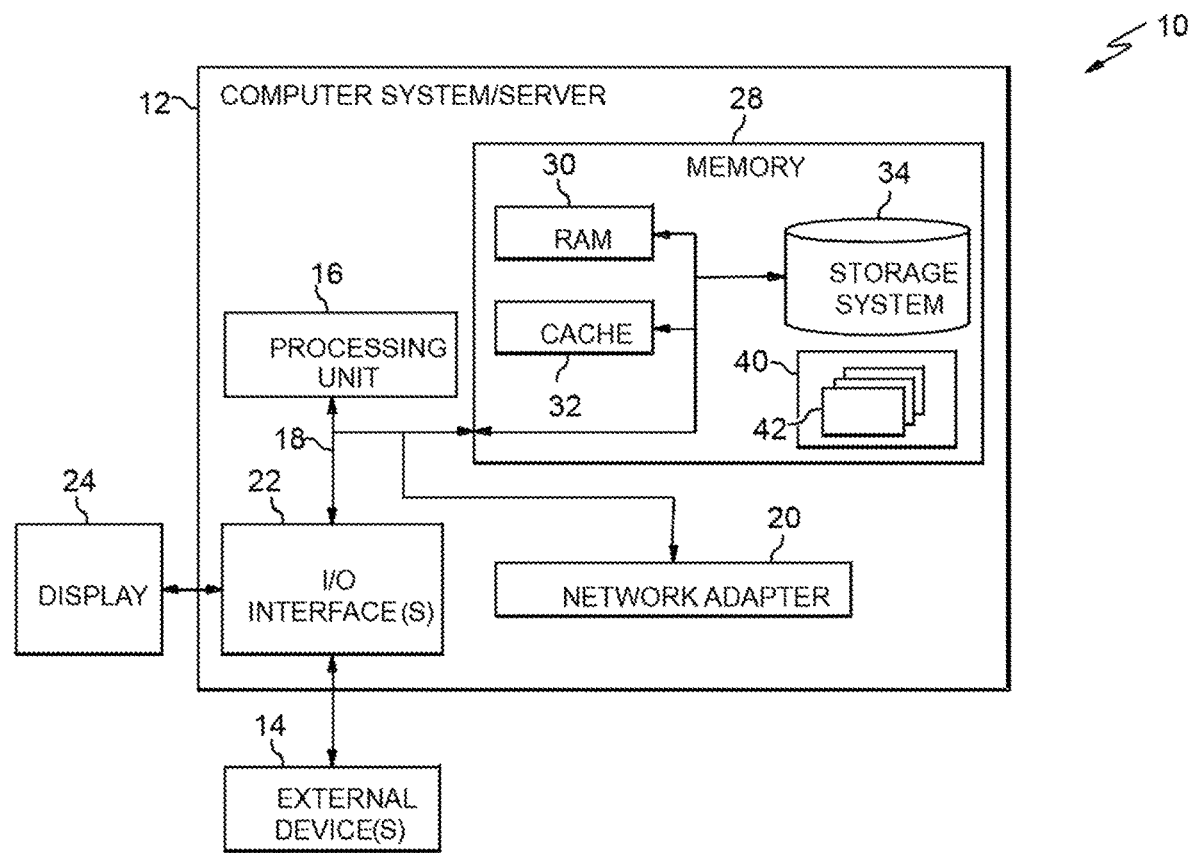
FIG. 1 depicts a cloud computing node according to an embodiment of the present invention.

Aspects of the present invention relate generally to automated information systems and, more particularly, to an automated intelligent interactive information system that presents questions to a user based on previous input from the user and conditions that exist in a knowledge base of the system. According to aspects of the invention a computer device develops a dialog for extracting information from a user asking a question and stores that dialog for future use. In embodiments, the computer device receives a question from a user; extracts from a knowledge base multiple answers to the question; detects one or more terms (relationship entities) that exist in a subset of the multiple answers to the question; determines that one or more terms have different values in multiple ones of the subset of answers; generates one or more follow-up questions that solicit values of the one or more terms from the user; presents to the user one answer that satisfies the user's answers to the follow-up questions; and stores the user question, the multiple answers, and the terms in a knowledge corpus for use in answering future questions. In this manner, implementations of the invention intelligently develop over time a knowledge corpus that facilitates efficient answering of future questions in an interactive automated information system.

Embodiments of the invention improve the functioning of a computer by intelligently developing an electronic knowledge corpus that is accessed by a computer-based interactive automated information system by causing the computer to more efficiently produce an accurate answer to a user's specific question. The computer-based interactive automated information system determines that one or more common terms in multiple answers extracted from one or more databases have different values in multiple ones of the multiple answers, and generates one or more follow-up questions that solicit values of the one or more terms from a user asking a question.

Embodiments of the invention improve the technology of computer-based interactive automated information systems by storing the user question, the multiple answers, and the terms in a knowledge corpus for use in answering future questions. As a result, embodiments of the invention improve the efficiency and accuracy of a computer-based interactive automated information system.

Embodiments of the invention include other than what is well-understood, routine, conventional activity in the field of computer-based interactive automated information systems. For example, embodiments of the invention detect a first relationship entity that exists in a subset of multiple answers to a user question, determine that the first relationship entity is a condition (a condition being a relationship entity that has different values in the subset of the multiple answers), generates one or more follow-up questions that solicits a value of the condition, present one of the multiple answers that has the value of the condition that matches the answer to the one or more follow-up questions as a final answer to the user's question, and stores the question, multiple answers, terms, and conditions in a knowledge tree for use in answering future questions. Embodiments of the invention are a practical application of the above steps in that they are applied to a computer-based automated information system that provides answers to users over, for example, a telephone communication system.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In industries (for example, human resources, insurance, automobile) that have a knowledge base and want to apply a chatbot to answer questions asked by their users directly from the knowledge base, the company will, in some cases, train the chatbot based on its vast company knowledge base. In some such situations, in trying to impart vast company documents to the "knowledge" of the chatbot, the company may face certain issues.

One example of an issue that is faced is that because the chatbot knowledge comes from documents, answers generated by the chatbot can be less accurate than desired. Auto parsing of a document is often performed with a defined rule and, as a result, the chatbot will provide only a one level answer, which may be an answer that has qualifications or other information that the user must consider to get the answer to their question.

Another example of an issue that is faced is that such systems can result in data duplication and/or computing duplication. For example, documents in a knowledge base usually have much in common but are only different in one factor such as, for example, an organization to which the documents belong. This commonality results in multiple very similar databases being searched for an answer, which leads to a duplication of answers and/or a duplication of computing resource expenditure.

Another example of an issue that is faced is that such systems produce a conversation dialog that is static and does not intelligently adjust. The conversation dialog is often pre-defined by business analysis and/or operations according to the business and can, as a result, only handle very limiting business scenarios while also requiring a large amount of effort to design and maintain.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
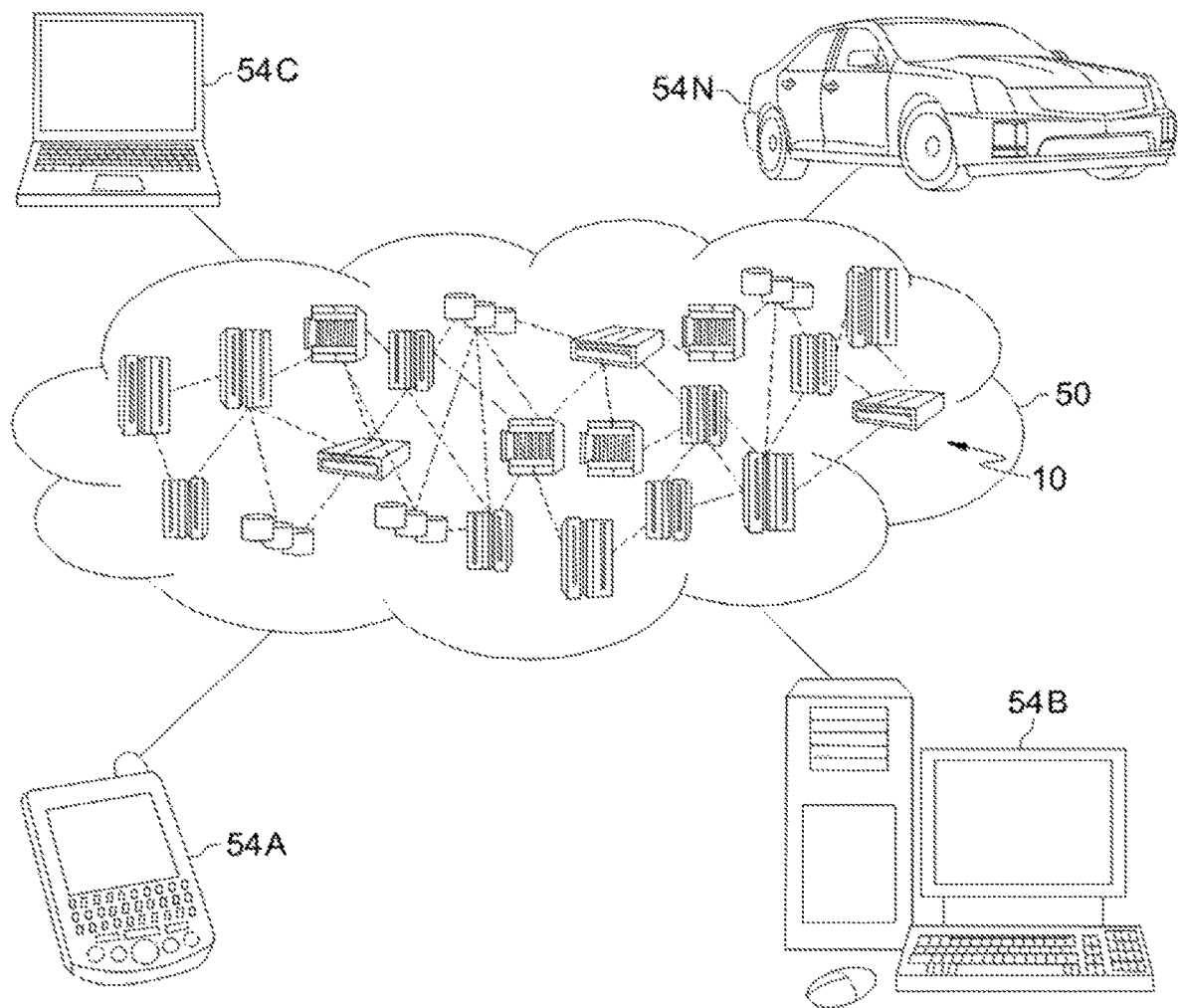
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
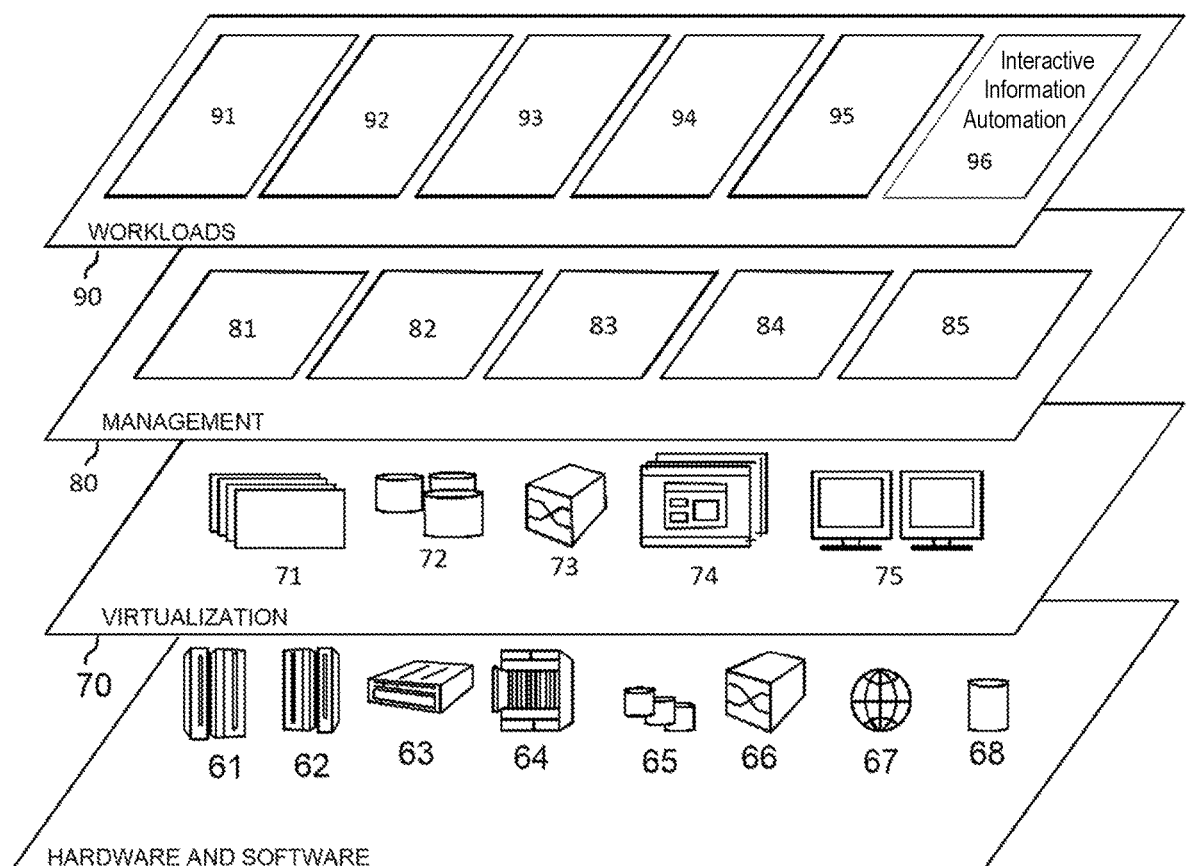
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and interactive information automation 96.

Implementations of the invention may include a computer system/server 12 of FIG. 1 in which one or more of the program modules 42 are configured to perform (or cause the computer system/server 12 to perform) one of more functions of the interactive information automation 96 of FIG. 3. For example, the one or more of the program modules 42 may be configured to: receive a user question; extract, from a knowledge base, multiple answers to the user question; detect a first relationship entity that exists in a subset of the multiple answers to the user question; determine that the first relationship entity is a condition, a condition being a relationship entity that has different values in the subset of the multiple answers; generate a first follow-up question that solicits a value of the condition; receive an answer to the first follow-up question; and determine a number of the subset of the multiple answers that have a value of the condition that matches the answer to the first follow-up question.

Figure 4:
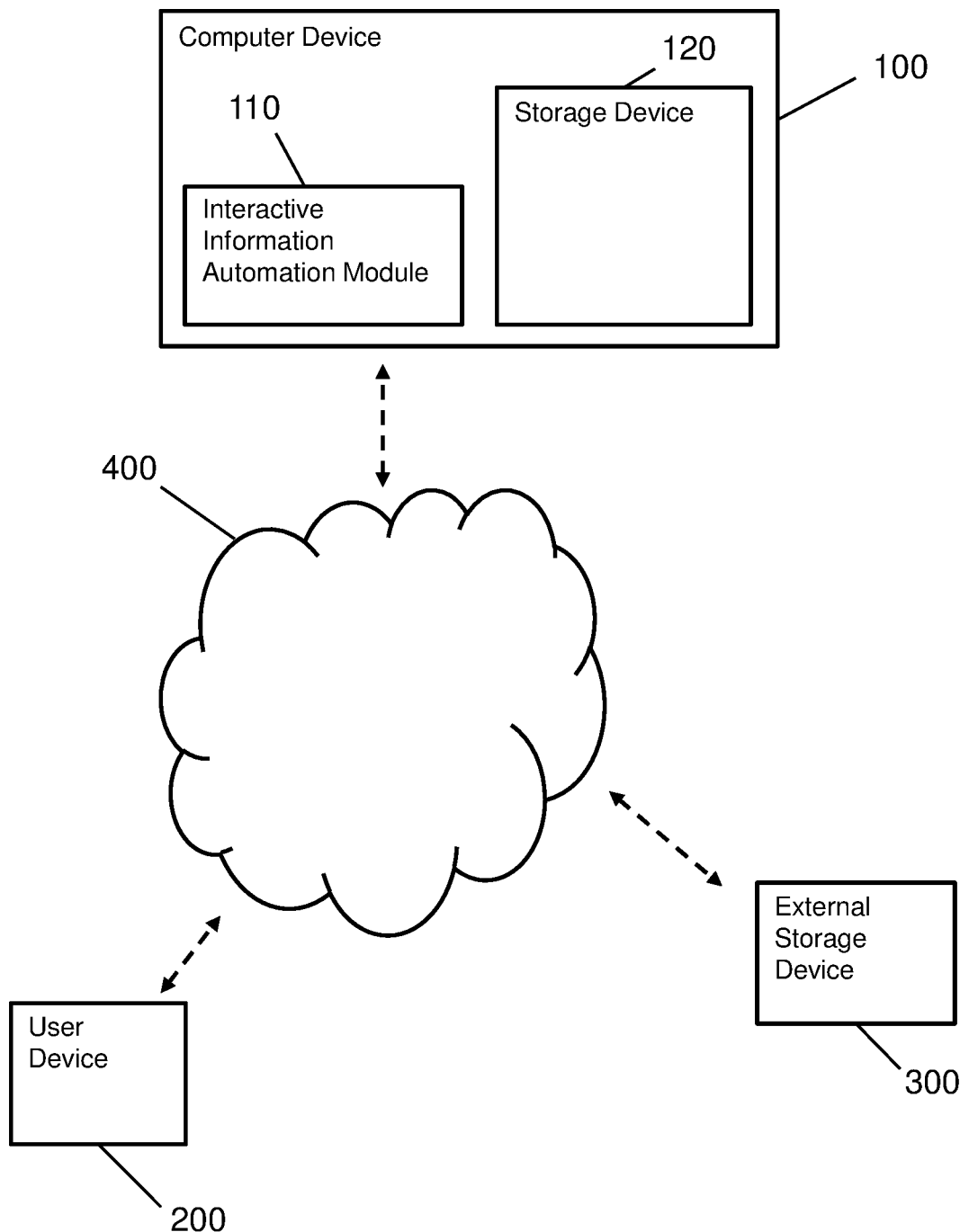
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1, that communicates over one or more networks 400 such as, for example, cloud computing environment 50. In this example, computer device 100 includes an interactive information automation module 110, for example, one or more of program modules 42 in FIG. 1, and a storage device 120 such as, for example, storage system 34 in FIG. 1. FIG. 4 also shows an external storage device 300 such as, for example, storage system 34 in FIG. 1, that computer device 100 accesses through network 400. In embodiments, external storage device 300 is accessed directly by computer device 100.

FIG. 4 shows a user device 200 such as, for example, a telephone or other electronic device with which a user communicates with computing device 100. In this exemplary embodiment, user device 200 receives the users voice and transmits it to computer device 100. In other embodiments, user device 200 receives text or other communication data input by the user and transmits that data to computer device 100.

In embodiments, computer device 100 comprises interactive information automation module 110, which may comprise one or more program modules such as program modules 42 described with respect to FIG. 1. Computer device 100 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

Figure 5:
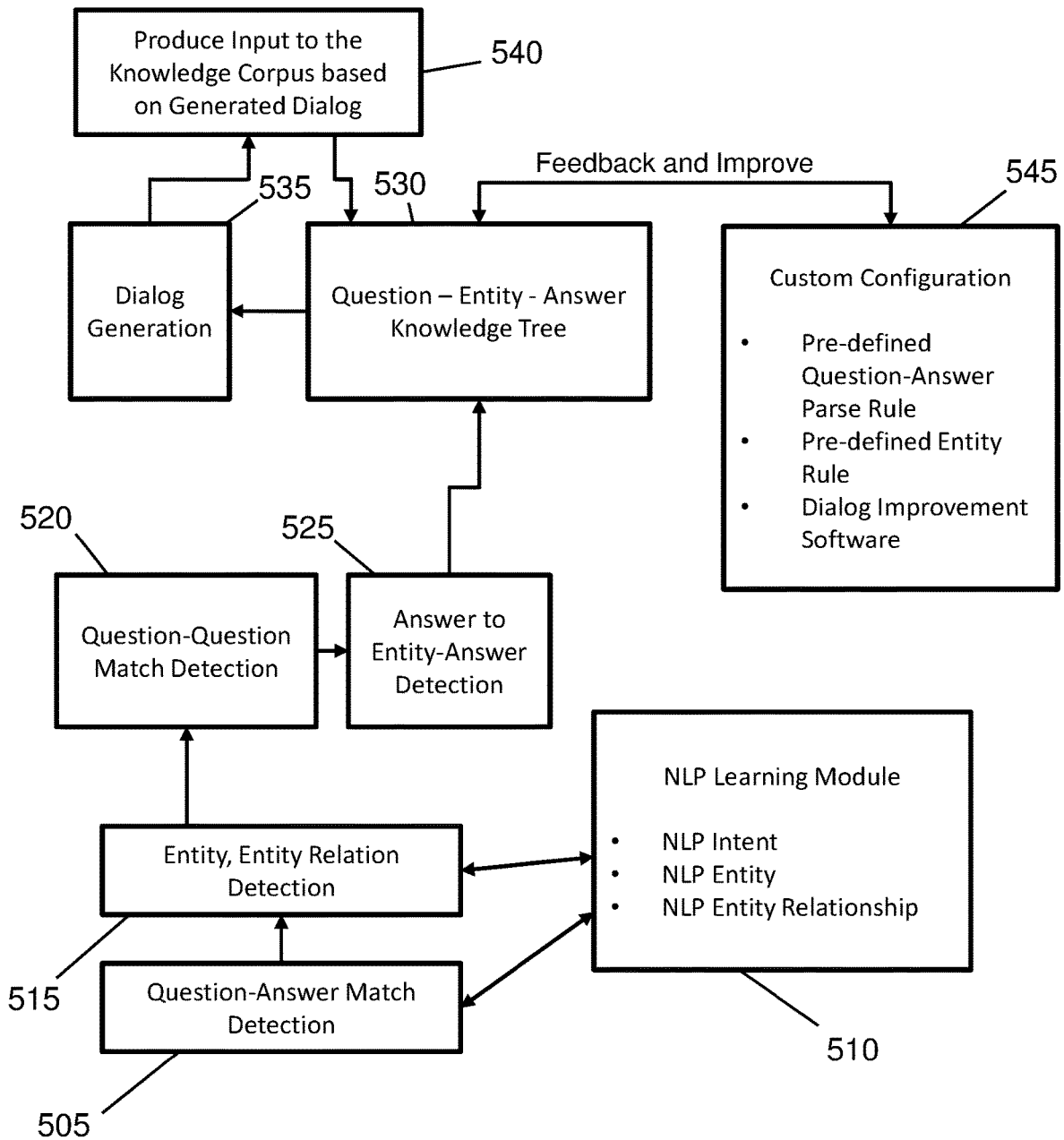
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 505, the system detects one or more question-answer matches by finding one or more answers that match a question asked by a user. In embodiments, and as described with respect to FIG. 4, interactive information automation module 110 detects one or more answers, that reside, for example, in a knowledge base stored on one or more external storage device 300 and/or storage device 120, that match a question asked by a user. In embodiments, the knowledge base comprises databases, websites, the knowledge tree (described below), and other sources of information. In embodiments, interactive information automation module 110 performs the question-answer pairing at step 505 using a natural language processing (NLP) learning module 510 that is, for example, a part of interactive information automation module 110. In embodiments, interactive information automation module 110 performs the question-answer pairing at step 505 using a pre-defined basic question-answer parse rule, a pre-defined entity rule, and/or dialog improvement software.

At step 515, the system detects entities and entity-relations between answers detected at step 505. In embodiments, and as described with respect to FIG. 4, interactive information automation module 110 detects any entities that are common to two or more answers that interactive information automation module 110 detected at step 505. In embodiments, entities are terms related to the answers detected at step 505. Non-exclusive examples of entities include name, company, location, telephone number, event, number of days of annual leave, etc. In embodiments, interactive information automation module 110 considers answers that contain (or have related to them) common entities as being useful in refining the final answer that interactive information automation module 110 gives to the user, as will be described in more detail below.

At step 520, the system detects question-question matches as answers detected at step 505 that have common entities detected at step 515. In embodiments, and as described with respect to FIG. 4, interactive information automation module 110 detects questions detected at step 505 that have entities in common, as detected at step 515. Common entities that have different values are called conditions. An example of a condition is "location" when, for example, the location in one answer is City A and the location in another answer is City B. In embodiments, interactive information automation module 110 considers answers that contain conditions as being useful in refining the final answer that interactive information automation module 110 gives to the user. For example, if the user's question is "how much annual leave am I allotted each year?", and the final answer to that question depends on the location (city) in which the user works, the value of location condition is a factor related to the final answer.

At step 525, the system obtains an answer from the user to a follow-up question raised by an entity-answer. In embodiments, and as described with respect to FIG. 4, interactive information automation module 110 presents a question to the user to determine which answer from step 520 is applicable to the user, and obtains an answer to that question from the user. Continuing with the example used above in relation to step 520, interactive information automation module 110 ask the user the city in which the user resides. In the case of the user answering "City A", interactive information automation module 110 determines that the number of days of annual leave that applies to residents of City A applies to the user. As will be described in more detail below, in some embodiments, interactive information automation module 110 performs multiple loops of steps 515, 520, 525 to narrow the answers detected at step 505 down to the final answer.

At step 530, the system saves the question-entity-answer matchings detected in step 525 to a knowledge corpus (such as, for example, a knowledge tree). In embodiments, and as described with respect to FIG. 4, interactive information automation module 110 saves the question-entity-answer matchings detected in step 525 to a knowledge corpus (such as, for example, a knowledge tree) stored on storage device 120. In embodiments, interactive information automation module 110 continually updates the knowledge corpus with the question-entity-answer matchings saved at step 530 to create a more detailed knowledge corpus that will simplify, and make more accurate, future detecting at step 505.

At step 535, the system generates dialog to be presented to a future user that asks a question similar to the question asked by the user prior to step 505. In embodiments, and as described with respect to FIG. 4, interactive information automation module 110 generates dialog for interactive information automation module 110 to present to a user asking a question that is at least partly similar to the question asked by the user prior to step 505. In embodiments, the generated dialog continually improves the follow-up questions asked (by automated voice on a telephone call, for example) at step 525 based on previous uses.

At step 540, the system produces input to the knowledge corpus based on the dialog generated at step 535. In embodiments, and as described with respect to FIG. 4, interactive information automation module 110 produces input to the knowledge corpus (which is a knowledge tree in some embodiments) based on the dialog the interactive information automation module 110 generates at step 535.

At step 545, the system includes custom configurations including, for example, a pre-defined question-answer parse rule, a predefined entity rule, and dialog improvement software. In embodiments, and as described with respect to FIG. 4, interactive information automation module 110 performs the question-answer pairing at step 505 using a pre-defined question-answer parse rule. In embodiments, interactive information automation module 110 detects entities that are common to two or more answers at step 515 using a pre-defined question-answer parse rule. In embodiments, interactive information automation module 110 generates the dialog at step 535 using dialog improvement software.

As shown in FIG. 5, in embodiments, interactive information automation module 110 improves the knowledge tree using feedback from the various custom configurations at step 545. For example, interactive information automation module 110 improves the accuracy of answers in the knowledge tree to a particular question by examining the pre-defined question-answer parse rule and the question-answer matches detected at step 505 and updating the knowledge tree accordingly.

As an example of the operation of interactive information automation module 110, a question regarding what days are considered holiday days for a Spring Festival will be analyzed. Presenting the question to the websites of three countries produces three different answers: asking Country A website, you will get an answer that applies to Country A; asking Country B website, you will get an answer that applies to Country B; and asking Country C website shows that Country C does not have this holiday. Some systems (for example, chatbots) find multiple similar questions from its database, find the most similar question, and provide the answer in its database that applies to that question. This often results in an answer that is not accurate and/or is nonsensical.

FIGS. 6-8 show an example in accordance with embodiments of the invention of a dialog between interactive information automation module 110 and a user to answer a question presented by the user. FIG. 6 is a table 600 showing basic annual leave for a particular company based on the city in which the user works. FIG. 7 is a chart 700 showing supplemental annual leave for the company based on various factors that may or may not apply to a particular employee. FIG. 8 is a flow chart showing a series of follow-up questions that interactive information automation module 110 asks the user to determine the final answer to the user's question. In the following description, in embodiments, the term "asks the user" is understood to mean that computer device 100 (or a portion thereof) transmits an instruction to user device 200 (through network 400 or otherwise) directing user device 200 to audibly (or otherwise) present the question to the user. Also, in the following description, in embodiments, the term "receives an answer" is understood to mean that computer device 100 (or a portion thereof) receives information that represents an answer from user device 200 (through network 400 or otherwise).

At step 805, the user asks the question "how many days of annual leave am I allowed?". Interactive information automation module 110 searches various databases in the knowledge base (such as the company human resources database, external website, etc., for example) to determine that to answer the user's question, more information is needed. For example, interactive information automation module 110 finds multiple answers to the user's question in the human resources database depending on the city in which the user works (as shown by table 600). From the data in table 600 interactive information automation module 110 determines "city" is an entity (from step 515 in FIG. 5) and that "city" (the city in which the user works) is a condition (from step 520 in FIG. 5) because multiple values apply to the entity "city".

As a result, at step 810 interactive information automation module 110 asks the user in which city the user works. At step 815 interactive information automation module 110 receives an answer from the user that indicates that the user works in City A. Interactive information automation module 110 matches "City A" to the data in table 600, resulting in the user having a base annual leave of 10 days because the user works in City A. In embodiments, interactive information automation module 110 then determines what, if any, of the conditions in chart 700 apply to the user and, as a result, modify the base annual leave of the user.

At step 820, interactive information automation module 110 asks the user if the user is in Work Group B (the first condition in chart 700). At step 825 interactive information automation module 110 receives an answer from the user that indicates that the user is in Work Group B. In embodiments, interactive information automation module 110 matches this information to the data in chart 700, resulting in the user having an additional one day of annual leave because the user is in Work Group B.

At step 830, interactive information automation module 110 asks the user how many years of service they have (the second condition in chart 700). At step 835 interactive information automation module 110 receives an answer from the user that indicates that the user has 10 years of service. In embodiments, interactive information automation module 110 matches this information to the data in chart 700, resulting in the user having an additional five days of annual leave because the user has 5 years of service over the threshold of 5 years.

At step 840, interactive information automation module 110 asks the user if they have received a level A award (the third condition in chart 700). At step 845 interactive information automation module 110 receives an answer from the user that indicates that the user has received a level A award. In embodiments, interactive information automation module 110 matches this information to the data in chart 700, resulting in the user having an additional one day of annual leave because the user is a recipient of a level A award.

At step 850, interactive information automation module 110 determines that, based on the user's answers at steps 815, 825, 835, and 845, and the data in table 600 and chart 700, that the user is entitled to 17 days of annual leave and presents that answer to the user. This answer is an accurate answer to the user's question. Interactive information automation module 110 determines this answer by recognizing the conditions (city, work group membership, service years, and award status) and receiving values for those conditions before presenting a final answer to the user. This avoids presenting an answer to the user that contains multiple conditions which the user would have to interpret to arrive at the correct answer.

In embodiments, the final answer to the user question comprises additional information that is related to the user question but is not specifically requested by the user question. For example, continuing with the example shown in FIG. 8, in embodiments, the final answer includes additional information regarding the dates by which the annual leave must be used to avoid losing a portion of the annual leave. This additional information may be useful to the user even though the user did not request this information in the user question.

Embodiments of the invention use one or more mapping rules to determine which answers from the knowledge base apply to the user's question. For example, in embodiments, mapping rules include: matching numbers; tables (for example, table 600); charts (for example, chart 700); matching text; matching words that have similar meanings in different databases (for example, different industries); and other pre-defined mapping rules.

Figure 9:
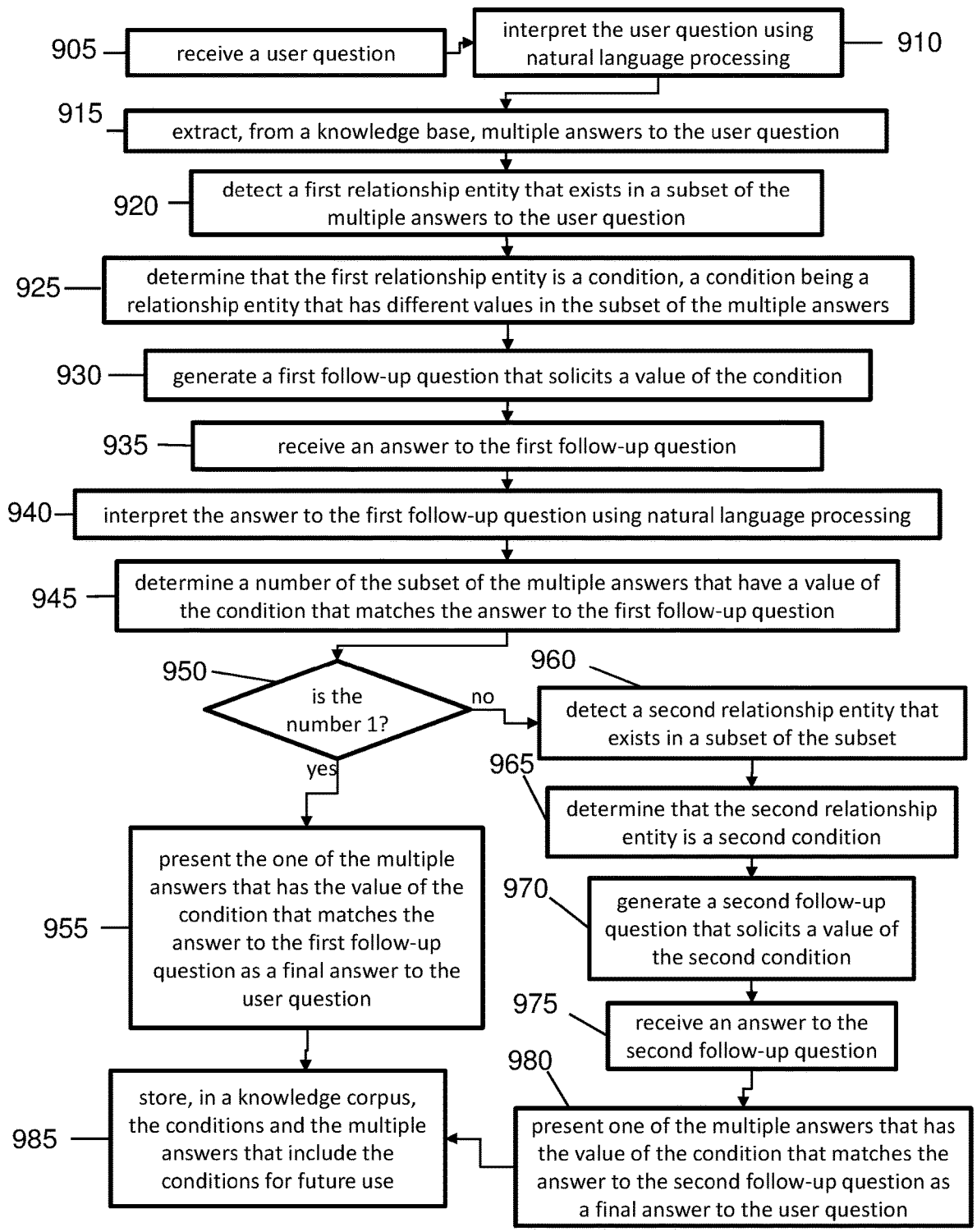
FIG. 9 shows a flowchart of an exemplary method in accordance with aspects of the invention.

FIG. 9 shows a flowchart of an exemplary method in accordance with aspects of the present invention. Steps of the method may be carried out in the environment of FIG. 4 and are described with reference to elements depicted in FIG. 4.

At step 905, the system receives a user question. In embodiments, and as described with respect to FIG. 4, interactive information automation module 110 receives a user question from a user.

At step 910, the system interprets the user question using natural language processing. In embodiments, and as described with respect to FIG. 4, interactive information automation module 110 interprets the user question using natural language processing.

At step 915, the system extracts, from a knowledge base, multiple answers to the user question. In embodiments, and as described with respect to FIG. 4, interactive information automation module 110 extracts, from a knowledge base (such as, for example, databases, websites, and other sources of data) stored on external storage device 300, multiple answers to the user question.

At step 920, the system detects a first relationship entity that exists in a subset of the multiple answers to the user question. In embodiments, and as described with respect to FIG. 4, interactive information automation module 110 detects a first relationship entity that exists in a subset of the multiple answers to the user question.

At step 925, the system determines that the first relationship entity is a condition, a condition being a relationship entity that has different values in the subset of the multiple answers. In embodiments, and as described with respect to FIG. 4, interactive information automation module 110 determines that the first relationship entity is a condition, a condition being a relationship entity that has different values in the subset of the multiple answers.

At step 930, the system generates a first follow-up question that solicits a value of the condition. In embodiments, and as described with respect to FIG. 4, interactive information automation module 110 generates a first follow-up question that solicits, through user device 200, a value of the condition from the user.

At step 935, the system receives an answer to the first follow-up question. In embodiments, and as described with respect to FIG. 4, interactive information automation module 110 receives an answer from the user, through user device 200, to the first follow-up question.

At step 940, the system interprets the answer to the first follow-up question using natural language processing. In embodiments, and as described with respect to FIG. 4, interactive information automation module 110 interprets the answer (received from the user) to the first follow-up question using natural language processing.

At step 945, the system determines a number of the subset of the multiple answers that have a value of the condition that matches the answer to the first follow-up question. In embodiments, and as described with respect to FIG. 4, interactive information automation module 110 determines a number of the subset of the multiple answers that have a value of the condition that matches the answer to the first follow-up question.

At step 950, the system determines if the number of the subset of the multiple answers that have a value of the condition that matches the answer to the first follow-up question equals 1. In embodiments, and as described with respect to FIG. 4, interactive information automation module 110 determines if the number of the subset of the multiple answers that have a value of the condition that matches the answer to the first follow-up question equals 1. If the number equals 1, then processing proceeds to step 955. If the number is other than 1, then processing proceeds to step 960.

At step 955, the system presents the one of the multiple answers that has the value of the condition that matches the answer to the first follow-up question as a final answer to the user question. In embodiments, and as described with respect to FIG. 4, interactive information automation module 110 presents the one of the multiple answers that has the value of the condition that matches the answer to the first follow-up question as a final answer to the user question.

At step 960, the system detects a second relationship entity that exists in a subset of the subset. In embodiments, and as described with respect to FIG. 4, interactive information automation module 110 detects a second relationship entity that exists in a subset of the subset.

At step 965, the system determines that the second relationship entity is a second condition. In embodiments, and as described with respect to FIG. 4, interactive information automation module 110 determines that the second relationship entity is a second condition.

At step 970, the system generates a second follow-up question that solicits a value of the second condition. In embodiments, and as described with respect to FIG. 4, interactive information automation module 110 generates a second follow-up question that, through user device 200, solicits a value of the second condition from the user.

At step 975, the system receives an answer to the second follow-up question. In embodiments, and as described with respect to FIG. 4, interactive information automation module 110 receives an answer from the user, through user device 200, to the second follow-up question.

At step 980, the system presents one of the multiple answers that has the value of the condition that matches the answer to the second follow-up question as a final answer to the user question. In embodiments, and as described with respect to FIG. 4, interactive information automation module 110 presents (to the user, through user device 200) one of the multiple answers that has the value of the condition that matches the answer to the second follow-up question as a final answer to the user question.

At step 985, the system stores, in a knowledge corpus, the conditions and the multiple answers that include the conditions for future use. In embodiments, and as described with respect to FIG. 4, interactive information automation module 110 stores, in a knowledge corpus, the condition (or conditions) and the multiple answers that include the condition (or conditions) for future use.

In embodiments, at step 975 processing proceeds to step 940 to determine if the number is 1 at step 950 in relation to the second follow-up question. In embodiments, processing continues to loop from step 975 to step 940 until the number in step 950 is 1. In this manner, interactive information automation module 110 continues to generate follow-up questions until the number in step 950 is 1.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a computer device, a user question;
   extracting, by the computer device and from a knowledge base accessed through a network adapter, multiple answers to the user question;
   detecting, by the computer device, a first relationship entity that is a common term to at least two answers of the multiple answers to the user question;
   determining, by the computer device, that the first relationship entity is a condition comprising a location, wherein the condition is a relationship entity that has different location values in the at least two answers of the multiple answers, the first relationship entity is the common term to the different location values of the at least two answers of the multiple answers and the condition being a factor related to a final answer;
   generating, by the computer device, a first follow-up question that solicits a value of the condition from the user;
   receiving, by the computer device, an answer to the first follow-up question;
   determining, by the computer device, a number of the at least two answers of the multiple answers that have a value of the condition that matches the answer to the first follow-up question;
   detecting, by the computer device and in response to the number being other than 1, a second relationship entity being a second common term to other different values that exist in the at least two answers of the multiple answers;
   storing, by the computer device, the condition and the multiple answers that include the condition for future use in a knowledge corpus; and
   dynamically improving, by the computing device, future follow-up questions asked by an automated voice based on the stored condition and the multiple answers that include the condition for future use in the knowledge corpus,
   wherein the second relationship entity includes a different relationship entity than the first relationship entity.

2. The method of claim 1, further comprising storing, by the computer device and in a knowledge corpus, the condition and the multiple answers that include the condition for future use,
   wherein the first relationship entity comprises a name and the second relationship entity comprises a telephone number.

3. The method of claim 2, wherein the knowledge corpus is a knowledge tree.

4. The method of claim 1, further comprising interpreting, by the computer device, the user question using natural language processing,
   wherein the first relationship entity comprises an event and the second relationship entity comprises a name.

5. The method of claim 4, further comprising interpreting, by the computer device, the answer to the first follow-up question using natural language processing.

6. The method of claim 1, wherein a portion of the knowledge base is located externally to the computer device.

7. The method of claim 1, further comprising as a result of the number being other than 1:
   determining, by the computer device, that the second relationship entity is also a second condition;
   generating, by the computer device, a second follow-up question that solicits a value of the second condition being a factor related to a final answer to the user question;
   receiving, by the computer device, an answer to the second follow-up question; and
   presenting, by the computer device, one of the multiple answers that has the value of the second condition that matches the answer to the second follow-up question as the final answer to the user question.

8. The method of claim 1, wherein the relationship entity is one selected from the group consisting of a person name, a company name, and a location.

9. The method of claim 1, wherein the final answer to the user question comprises additional information that is related to the user question but is not specifically requested by the user question.

10. The method of claim 1, wherein the user question is received from a user.

11. The method of claim 10, wherein the first follow-up question solicits the value from the user.

12. The method of claim 1, further comprising presenting, by the computer device and in response to the number being 1, the one of the multiple answers that has the value of the condition that matches the answer to the first follow-up question as a final answer to the user question, the matching being based upon one or more mapping rules including matching numbers, tables, charts, text, and words with similar meaning in different databases.

13. A computer program product comprising one or more computer readable storage media having program instructions collectively stored on the one or more computer readable storage media, the program instructions executable to:
   receive a user question from a user;
   extract from a knowledge base accessed through a network adapter multiple answers to the user question;
   detect a first relationship entity that is a common term to at least two answers of the multiple answers to the user question;
   determine that the first relationship entity is a condition comprising a location, wherein the condition is a relationship entity that has different location values in the at least two answers of the multiple answers, the relationship entity is the common term to the different location values of the at least two answers of the multiple answers and the condition being a factor related to a final answer;
   generate a first follow-up question that solicits from the user a value of the condition;
   receive from the user an answer to the first follow-up question;
   determine a number of the at least two answers of the multiple answers that have a value of the condition from the user that matches the answer to the first follow-up question;
   in response to the number being other than 1, detect a second relationship entity being a second common term to other different values that exist in the at least two answers of the multiple answers;
   store the condition and the multiple answers that include the condition for future use in a knowledge corpus; and
   dynamically improve future follow-up questions asked by an automated voice based on the stored condition and the multiple answers that include the condition for future use in the knowledge corpus, wherein the second relationship entity includes a different relationship entity than the first relationship entity.

14. The computer program product of claim 13, wherein, as a result of the number being other than 1, the program instructions are further executable to:
determine that the second relationship entity is also a second condition;
generate a second follow-up question that solicits from the user a value of the second condition;
receive from the user an answer to the second follow-up question; and
present one of the multiple answers that has the value of the condition that matches the answer to the second follow-up question as a final answer to the user question.

15. The computer program product of claim 14, wherein the final answer to the user question comprises additional information that is related to the user question but is not specifically requested by the user question, and the matching being based upon one or more mapping rules including matching numbers, tables, charts, text, and words with similar meaning in different databases, and the first relationship entity comprises a name and the second relationship entity comprises a telephone number.

16. The computer program product of claim 13, wherein the program instructions are further executable to store in a knowledge corpus, for future user, the condition and the multiple answers that include the condition, and the first relationship entity comprises an event and the second relationship entity comprises a name.

17. A system comprising:
a processor, a computer readable memory, one or more computer readable storage media, and program instructions collectively stored on the one or more computer readable storage media, the program instructions executable to:
receive a user question from a user;
extract from a knowledge base accessed through a network adapter multiple answers to the user question;
detect a first relationship entity that is a common term to at least two answers of the multiple answers to the user question;
determine that the first relationship entity is a condition comprising a location, wherein the condition is a relationship entity that has different location values in the at least two answers of the multiple answers, the relationship entity is the common term to the different location values of the at least two answers of the multiple answers and the condition being a factor related to a final answer;
generate a first follow-up question that solicits from the user a value of the condition;
receive from the user an answer to the first follow-up question;
determine a number of the at least two answers of the multiple answers that have a value of the condition that matches the answer to the first follow-up question;
present, in response to the number being 1, the one of the multiple answers that has the value of the condition from the user that matches the answer to the first follow-up question as a final answer to the user question;
detect, in response to the number being other than 1, a second relationship entity being a second common term to other different values that exist in the at least two answers of the multiple answers;
store in a knowledge corpus, for future use, the condition and the multiple answers that include the condition; and
dynamically improve future follow-up questions asked by an automated voice based on the stored condition and the multiple answers that include the condition in the knowledge corpus,
wherein the second relationship entity includes a different relationship entity than the first relationship entity.

18. The system of claim 17, wherein the program instructions are further executable to interpret the user question using natural language processing, and the first relationship entity comprises a name and the second relationship entity comprises a telephone number.

19. The system of claim 18, wherein the final answer to the user question comprises additional information that is related to the user question but is not specifically requested by the user question, and the first relationship entity comprises an event and the second relationship entity comprises a name.

20. The method of claim 1, wherein the first relationship entity comprises a company and the second relationship entity comprises a number of days of annual leave.

* * * * *